United States Patent
Visintainer

(10) Patent No.: US 7,748,951 B2
(45) Date of Patent: Jul. 6, 2010

(54) BEARING HOUSING SEAL SYSTEM FOR CENTRIFUGAL PUMPS

(75) Inventor: Robert J. Visintainer, Augusta, GA (US)

(73) Assignee: GIW Industries, Inc., Grovetown, GA (US)

( * ) Notice: Subject to any disclaimer, the term of this patent is extended or adjusted under 35 U.S.C. 154(b) by 750 days.

(21) Appl. No.: 11/504,835

(22) Filed: Aug. 16, 2006

(65) Prior Publication Data

US 2008/0044274 A1 Feb. 21, 2008

(51) Int. Cl.
*F04D 29/08* (2006.01)

(52) U.S. Cl. ......................................... 415/111; 415/230

(58) Field of Classification Search .................. 415/111, 415/229, 230
See application file for complete search history.

(56) References Cited

U.S. PATENT DOCUMENTS

| | | | |
|---|---|---|---|
| 3,652,180 A * | 3/1972 | Choquette et al. ........... 415/113 |
| 4,022,479 A | 5/1977 | Orlowski |
| 4,181,312 A * | 1/1980 | Douglas ..................... 277/424 |
| 4,890,941 A | 1/1990 | Calafell, II et al. |
| 5,174,583 A | 12/1992 | Orlowski |
| 5,290,047 A | 3/1994 | Duffee et al. |
| 5,499,902 A * | 3/1996 | Rockwood ................... 415/113 |
| 5,667,356 A * | 9/1997 | Whittier et al. ............... 415/34 |

* cited by examiner

*Primary Examiner*—Edward Look
*Assistant Examiner*—Jesse Prager
(74) *Attorney, Agent, or Firm*—Womble Carlyle Sandridge & Rice, PLLC

(57) ABSTRACT

A bearing housing sealing system is provided for a centrifugal pump of the type having a rotating shaft supported by roller bearing elements, a housing for the roller bearing elements, the housing having a cylindrical entry for the passage of the pump shaft through the housing and isolating the roller bearing elements and a lubricant for the roller bearing elements. The bearing housing sealing system comprises an outer stationary cover that is attached about the cylindrical entry of the housing. The outer stationary cover includes a cylindrical opening for fitting around the pump shaft, and a raised portion extending outwardly from the housing and defining a casing having an inner volume. A flinger is positioned within the inner volume of the stationary cover and includes an outer face and an inner face. At least one set of vanes is formed either the outer face or the inner face. The flinger is further configured for attachment to the pump shaft for rotational movement with the shaft.

14 Claims, 6 Drawing Sheets

BEARING HOUSING SEAL SYSTEM FOR CENTRIFUGAL PUMPS

FIELD OF THE INVENTION

The present invention relates to sealing systems for centrifugal pumps, and more particularly, to a pump shaft bearing housing seal system for centrifugal slurry pumps.

BACKGROUND OF THE INVENTION

Centrifugal pumps, as the name implies, employ centrifugal force to lift liquids from a lower to a higher level or to produce a pressure. This type of pump, in its simplest form, comprises an impeller consisting of a connecting hub with a number of vanes and shrouds, rotating in a volute collector or casing. Liquid drawn into the center, or eye, of the impeller is picked up by the vanes and accelerated to a high velocity by rotation of the impeller. It is then discharged by centrifugal force into the casing and out the discharge branch of the casing. When liquid is forced away from the center of the impeller, a vacuum is created and more liquid flows into the center of the impeller. Consequently there is a flow through the pump. There are many forms of centrifugal pumps, including the type used to pass both solid and liquid mixtures. These are known as slurry pumps.

Slurry pumps are designed to transport solids mixed in a fluid, normally water. Slurry pump impellers are driven by a shaft that is supported by rolling element bearings contained within a bearing housing. A stuffing box is used to seal the shaft where it enters the casing of the pump. The stuffing box may have various configurations, but typically includes multiple packing rings that are compressed by a gland to form a seal around the rotating shaft between the internal working pressure of the pump and the atmosphere. When properly adjusted, a small amount of fluid (water) will leak from the stuffing box during operation. This fluid leakage is generally useful in cooling and lubricating the dynamic interface between the rotating shaft and the packing rings. As the packing rings wear under normal operation, however, this leakage increases. This ultimately causes the leakage to be directed against the bearing housing and bearing isolation seals. The bearing housing is typically a cylindrical volume that isolates the rolling element bearings from external contaminants and that contains and provides lubrication for the bearings.

There are several different bearing housing seal assembly designs currently being employed for sealing the shafts and bearing housing assemblies for centrifugal pumps. The purpose of the bearing housing seal assembly is to prevent external contaminants from entering the bearing housing and contaminating the oil or other lubricant therein. Some designs include what are known as "lip seals," which are commonly used in automotive applications. These designs, however, are subject to rapid wear and heat generation which can damage the shaft of the pump. Other seal designs include labyrinth arrangements having a series of internal grooves designed to contain lubricant within the bearing housing. Another form of sealing arrangement is commonly known as a bearing isolator, which is comprised of a stator and rotor arrangement which cooperate to form a series of labyrinth channels to prevent contaminants from reaching the bearing area.

Unfortunately, however, the existing designs may be defeated by the fluid volume and fluid velocity encountered when the stuffing box packing becomes worn or otherwise fails. When this occurs, water and solids are directed against the bearing seal area with considerable pressure, which may effectively "flood" the bearing housing seals and ultimately cause failure of the centrifugal pump.

SUMMARY OF THE INVENTION

The present invention is directed to a rotating bearing seal system for centrifugal pumps of the type having a bearing housing for isolating and maintaining the lubrication of a plurality of pump shaft bearings and that addresses the problems described above. More particularly, the bearing seal system of the present invention provides a construction of multiple seal and isolation aspects into an integrated system having unexpected results over the sealing systems of the prior art.

One aspect of the present invention is directed to a bearing housing sealing assembly for a centrifugal pump, comprising an outer stationary cover, or shroud, that is attached about the entry of the pump shaft into the bearing housing. The stationary cover includes an inner cylindrical opening that circumferentially surrounds the pump shaft. The diameter of the opening is dimensioned such that the gap between the cover and the pump shaft is no greater than about four times the expected operational radial movement of the pump shaft, including design tolerances. In one embodiment, the outer stationary cover houses a vaned flinger. The outer face of the flinger comprises a first set of outwardly directed rotating vanes that are oriented to direct any fluid entering the stationary cover through the gap outwardly into the inner volume of the cover where it is expelled through a lower drain port formed in the stationary cover. The inner face of the flinger may comprise a second set of rotating vanes. This second set of rotating vanes creates a secondary barrier surrounding an internal bearing isolator to further direct any fluid that should pass around the gap between the inner surface of the stationary cover and the flinger away from the bearing isolator and outwardly through the same drain port.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

DETAILED DESCRIPTION OF THE PREFERRED EMBODIMENTS

The present invention is directed to a bearing housing seal system aimed at addressing the problems described above. The present invention is best understood by first summarizing the prior art and current bearing seal systems.

Figure 1:
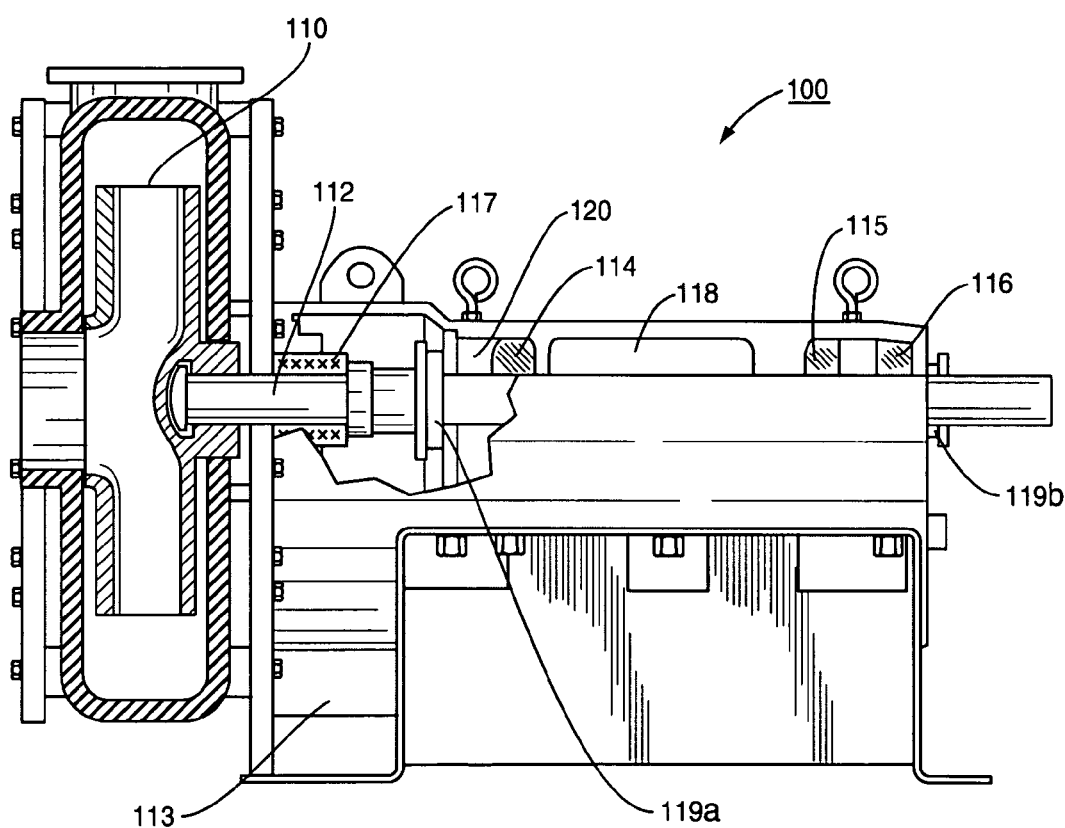
FIG. 1 is a schematic of a conventional centrifugal pump illustrating the pump shaft and pump shaft bearing housing.

Referring first to FIG. 1, a conventional centrifugal pump 100 is schematically illustrated. The impeller 110 of the pump is driven by a shaft 112 that is rotatably supported on a series of roller bearing elements 114, 115, and 116. At the impeller 110 end of the pump assembly is a stuffing box 117 which isolates and seals the shaft from the working area (impeller) of the pump. The roller bearing elements are contained within a generally cylindrical bearing housing 120. The roller bearing elements 114, 115, and 116 function to transfer the operating rotational forces of the pump shaft 112 to the pedestal 113 of the pump 100. Bearing seal assemblies 119a, 119b at opposite ends of the bearing housing 120 isolate the shaft 112 and the roller bearing elements 114, 115, 116 within the bearing housing 120 where lubricant is held therein for lubricating the roller bearing elements during pump operation. The lubricant in the bearing housing is maintained at a level sufficient to "splash" the roller bearing elements during normal operation of the pump 100.

Figure 2:
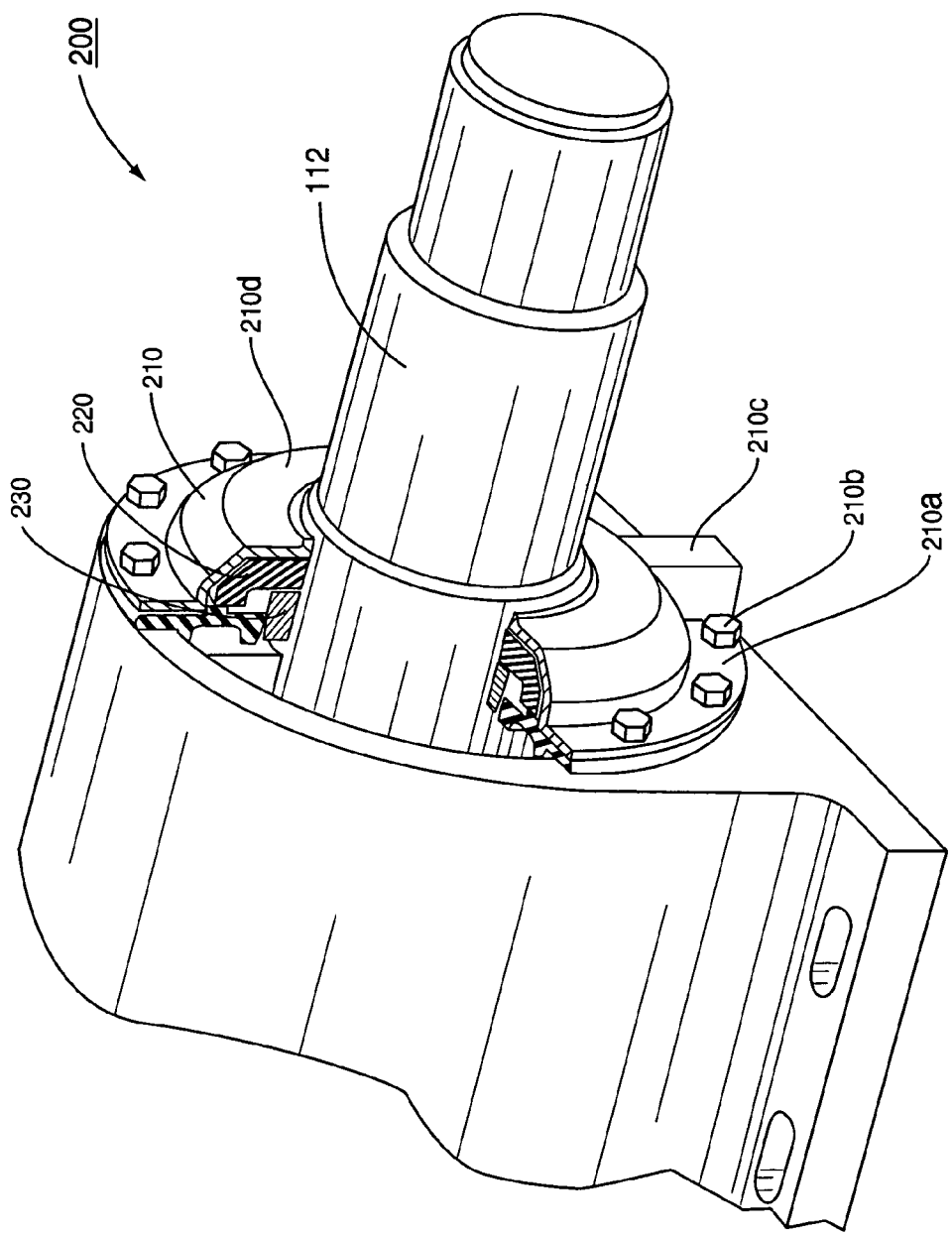
FIG. 2 is a cutaway view illustrating the rotating shaft bearing seal system of the present invention.
Figure 3:
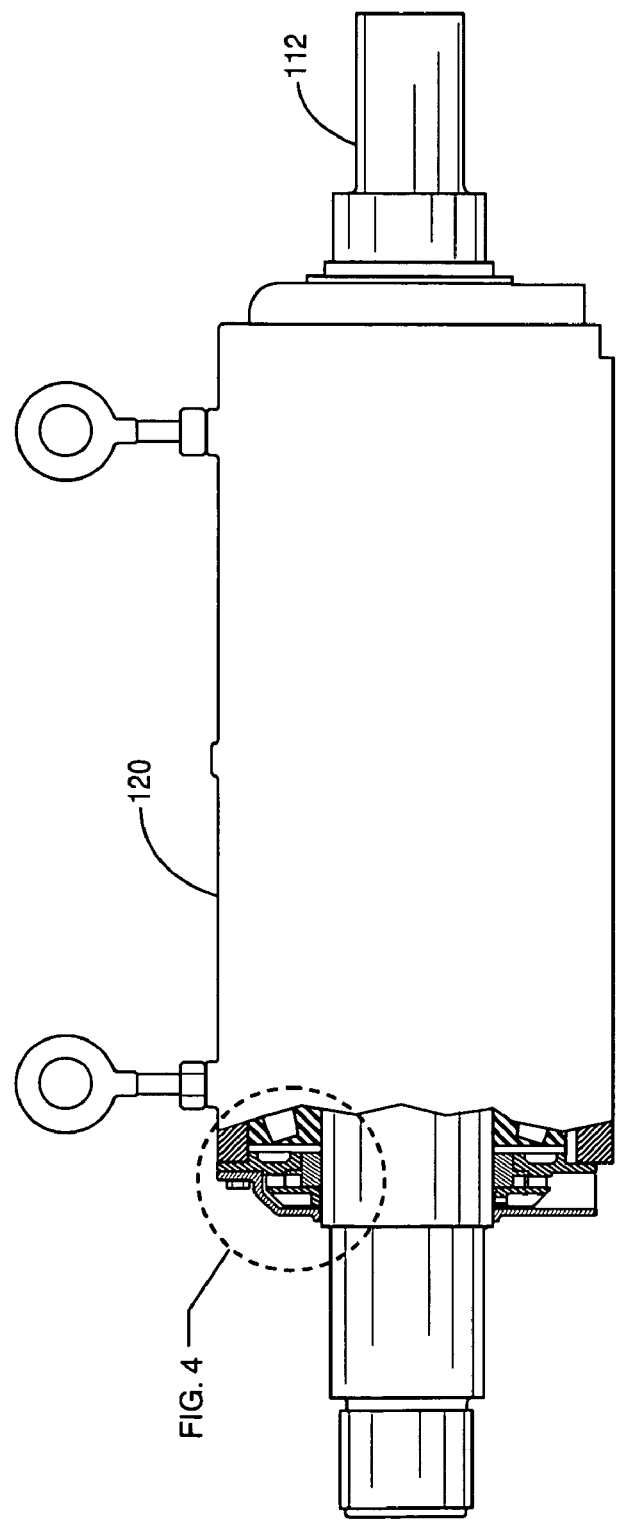
FIG. 3 is a side view of the bearing housing and bearing seal assembly of the present invention.
Figure 4:
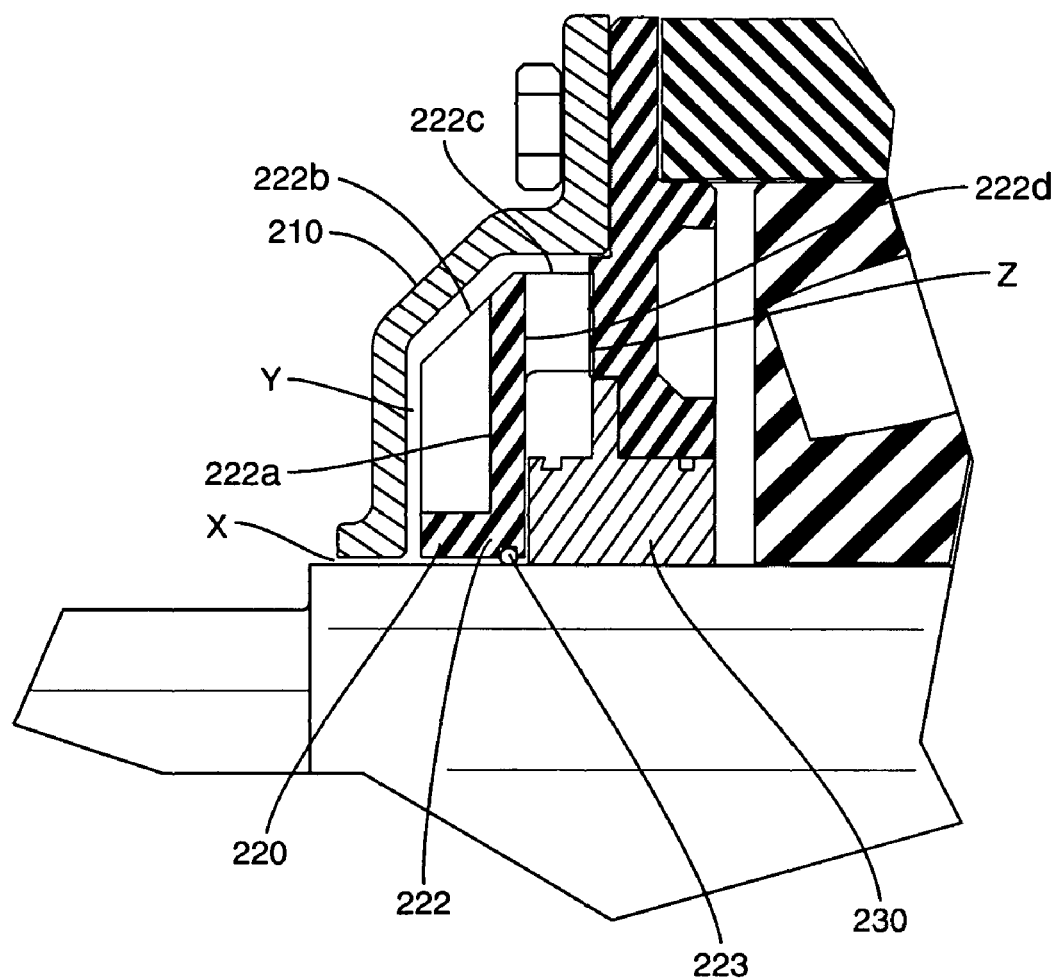
FIG. 4 is a close-up view of the bearing seal assembly of FIG. 3.

Turning now to FIGS. 2 through 4, the bearing housing seal system 200 of the present invention is shown in detail. In its simplest construction, the system 200 comprises an outer stationary cover or shroud 210, a rotating flinger 220 that is enclosed behind the stationary cover, and an internal bearing isolator 230 (shown as 119a in FIG. 1). The bearing housing seal system 200 is mounted to the bearing housing end wall 120a, surrounding the pump shaft 112.

Figure 5C:
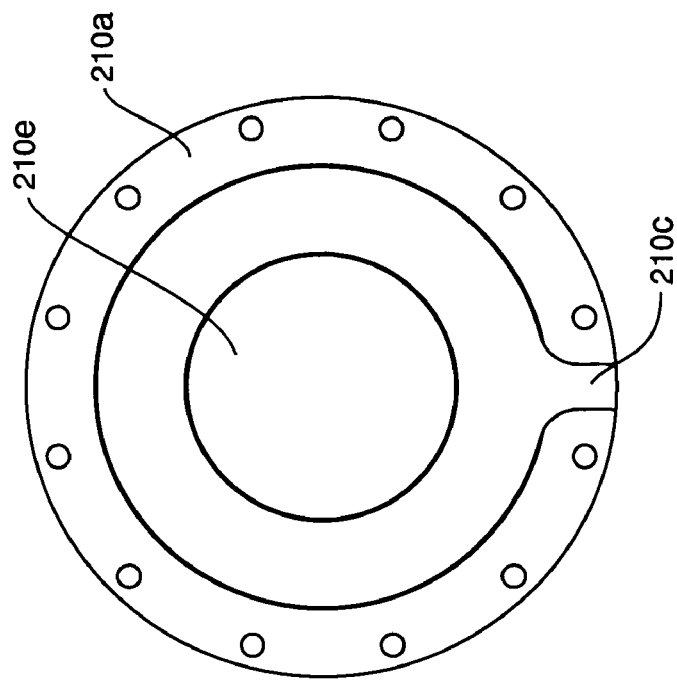
FIGS. 5A through 5C illustrate in detail the stationary cover of the bearing seal assembly of FIG. 3.
Figure 5B:
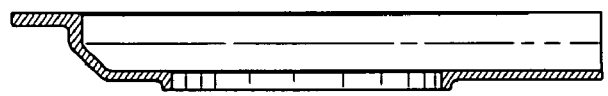
Figure 5A:
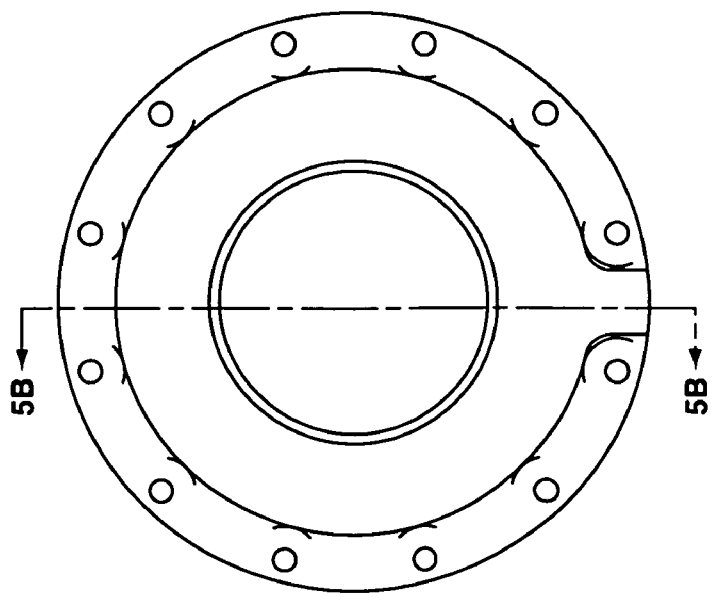

The stationary cover 210 is formed of any suitable metal, such as cast iron or stainless steel, depending upon the application for which the pump 100 is employed. The cover 210 comprises a circumferential flange 210a which is attached to the outer wall 120a of the bearing housing 120 with a plurality of spaced bolts 210b or other suitable fasteners. Extending outwardly from the flange 210a is the arcuate, generally convex shroud portion 210d. The shape and cross-section of the stationary cover 210 of one exemplary embodiment are best seen in FIGS. 5A through 5C. As will be explained in greater detail below, a drain port 210c is formed in the lower portion of the stationary cover 210 for expelling water from the interior of the cover 210.

As will be understood by those of ordinary skill in the art, the stationary cover 210 is dimensioned so that there is minimal clearance between the pump shaft 112 and the covered seal components. Specifically, the centrally located bore 210e (see FIG. 5C) of the shroud portion 210 is dimensioned so that when installed around the shaft 112 of the pump, the gap X (best shown in FIG. 4) between the shaft 112 and the outer diameter of the bore 210e is minimized to about four times the expected radial movement of the shaft, including design tolerances, vibration, etc. So dimensioned, the stationary cover 210 prevents substantially all of the flow, which flow may derive from the stuffing box 117 to flood the casing 118 of the pump 100, including larger particulates or debris, from penetrating the bearing housing seal 119a. Rather, any water or solid matter that does enter through the gap X will be expelled by the vaned flinger 220, as described in greater detail below.

Turning again to FIGS. 2 and 3 in general, and FIGS. 4 and 6 in particular, the vaned flinger 220 is dimensioned to conform to the inner geometry of the cover 210 so that a minimal gap Y exists for the same reasons described above. The vaned flinger 220 also is constructed of cast iron or other suitable metallic or durable material. The vaned flinger 220 is attached to the pump shaft 112 with set screws (not shown) or other suitable fasteners such that the flinger 220 rotates with the shaft 112. To prevent leakage between the flinger 220 and the outer surface of the shaft 112, at least one O-ring 223 is installed in a circumferential annulus formed in the vaned flinger 220.

Figure 6C:
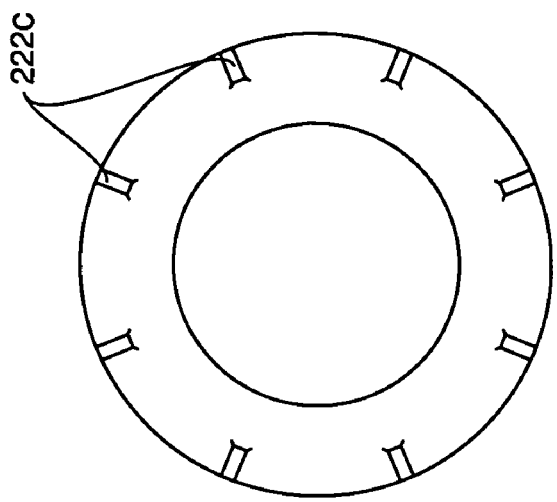
FIGS. 6A through 6C illustrate in detail the vaned flinger of the bearing seal assembly of FIG. 3.
Figure 6B:
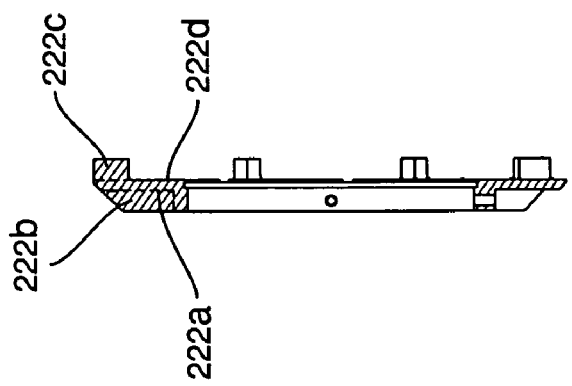
Figure 6A:
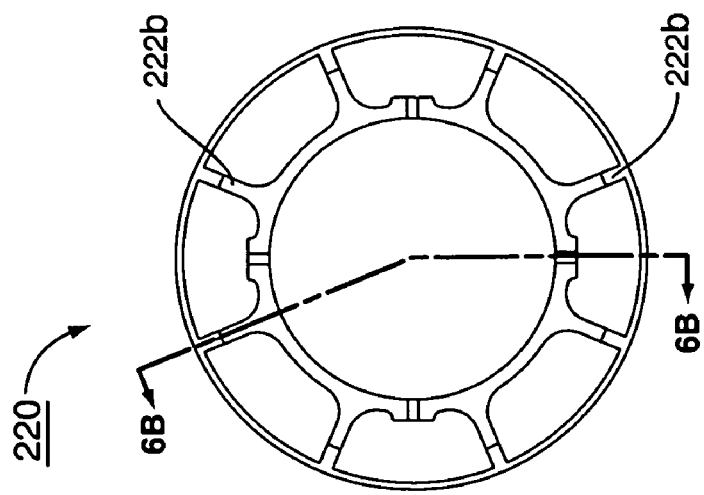

Formed on the outer face 222a of the flinger 220, and as best seen in FIGS. 6A through 6C, are a series of circumferentially spaced outwardly directed rotating vanes 222b that are oriented to direct any fluid entering the stationary housing cover 210 gap X outwardly into the stationary cover 210 inner volume where it then is forcefully expelled through the lower drain port 210c forming the lower portion of the stationary housing cover 210. In the exemplary embodiment shown in FIG. 6A, the vaned flinger 220 comprises eight spaced outwardly rotating vanes 222b. These vanes 222b may be of radial or curved configuration with the dimensions and number of vanes adjusted as required to match the shaft 112 rotational speed and other requirements of the design. The inner face 222d of the vaned flinger 220 comprises a second series of circumferentially spaced apart inwardly directed rotating vanes 222c. This second series of rotating vanes 222c create a secondary barrier surrounding the internal bearing isolator 230 to further direct any fluid that should pass around the flinger 220 through the gap Z between the flinger 220 and the inner volume of the stationary cover 210 away from the bearing isolator 230 and outwardly through the same drain port 210c. As best seen in FIG. 6C, the second series of rotating vanes 222c extends only partially downward from the inner face 222d of the vaned flinger 220. These vanes 222c also may be of radial or curved configuration with the dimensions and number of vanes adjusted as required to match the shaft 112 rotational speed and requirements of the design.

Referring again to FIGS. 2 and 3 in general, and FIG. 4 in particular, the inner bearing isolator 230 of the present invention is shown. As described above, bearing isolators are a common form of sealing arrangement, which are comprised of a stator and rotor arrangement (not specifically shown in the Figures) which cooperate to form a series of labyrinth channels (not shown) to prevent contaminants from reaching the bearing area. Further, internal grooves formed in the inner bearing isolator 230 are designed to reduce oil leakage from the bearing housing. The placement and installation of the inner bearing isolator 230 is conventional. One suitable inner bearing isolator is a Model 2VBXXH available from the INPRO/SEAL Company in Rock Island, Ill. In combination, the stationary cover 210, the dual sets of vanes 222b and 222c of the vaned flinger 220, and the bearing isolator 230 provide enhanced and unexpected sealing to the bearing housing 120.

Although the present invention has been described with a preferred embodiment, it is to be understood that modifications and variations may be utilized without departing from the spirit and scope of the invention, as those skilled in the art will readily understand. Such modifications and variations are considered to be within the purview and scope of the appended claims and their equivalents.

I claim:

1. A bearing housing seal system for a centrifugal pump of the type having a pump casing, an impeller mounted within the pump casing and connected to a rotating shaft supported by a plurality of roller bearing elements, the rotating shaft having a diameter, a bearing housing for the roller bearing elements, the bearing housing spaced apart from the pump casing along the rotating shaft and having an outer casing and cylindrical entry for the passage of the rotating shaft therethrough, and isolating the roller bearing elements and a lubricant for the roller bearing elements therein, the bearing housing seal system comprising:

(a) an outer stationary cover configured for attachment about the cylindrical entry of the outer casing of the bearing housing, the outer stationary cover having:

(i) a cylindrical opening therethrough conforming substantially to the diameter of the rotating shaft which projects therethrough;
(ii) a raised portion extending outwardly from the bearing housing and defining an inner volume about the rotating shaft;
(b) a flinger conforming substantially to and positioned within the inner volume of the stationary cover, the flinger having:
(i) an outer face and an inner face;
(ii) at least one set of vanes formed on at least one of the outer face and the inner face; and
(iii) wherein the flinger is attached to the rotating shaft for rotational movement with the shaft.

2. The seal system of claim 1 wherein the outer stationary cover further includes a flange for attachment about the cylindrical entry of the housing.

3. The seal system of claim 1 wherein the cylindrical opening of the outer stationary cover is dimensioned for non-contact with the rotating shaft.

4. The seal system of claim 1 wherein the outer stationary cover further includes a drain port.

5. The seal system of claim 1 wherein the flinger is geometrically dimensioned to conform to the geometry of the inner volume of the outer stationary cover.

6. The seal system of claim 1 wherein the flinger comprises a first set of vanes on the outer face and a second set of vanes on the inner face.

7. The seal system of claim 6 further comprising a bearing isolator disposed inwardly in an axial direction and adjacent to the inner second set of vanes.

8. A centrifugal pump having a pump casing, and an impeller mounted within the casing, the centrifugal pump comprising:
(a) a rotating shaft for interconnection to the impeller, the rotating shaft having a diameter and supported by a plurality of roller bearing elements;
(b) a housing for the roller bearing elements, the housing spaced apart from the pump casing along the rotating shaft and having an outer casing and cylindrical entry for the passage of the rotating shaft therethrough and isolating the roller bearing elements and a lubricant for the roller bearing elements therein;
(c) a bearing housing seal system, comprising:
(i) an outer stationary cover attached about the cylindrical entry of the outer casing of the bearing housing, the outer stationary cover having:
a cylindrical opening therethrough conforming substantially to the diameter of the rotating shaft which projects therethrough;
a raised portion extending outwardly from the bearing housing and defining an inner volume about the rotating shaft;
(ii) a flinger conforming substantially to and positioned within the inner volume of the stationary cover, the flinger having:
an outer face and an inner face;
at least one set of vanes formed on at least one of the outer face and the inner face; and
wherein the flinger is attached to the shaft for rotational movement with the rotating shaft.

9. The pump of claim 8 wherein the outer stationary cover further includes a flange for attachment about the cylindrical entry of the housing.

10. The pump of claim 8 wherein the cylindrical opening of the outer stationary cover is dimensioned for non-contact with the rotating shaft.

11. The pump of claim 8 wherein the outer stationary cover further includes a drain port.

12. The pump of claim 8 wherein the flinger is geometrically dimensioned to conform to the geometry of the inner volume of the outer stationary cover.

13. The pump of claim 8 wherein the flinger comprises a first set of vanes on the outer face and a second set of vanes on the inner face.

14. The pump of claim 13 further comprising a bearing isolator disposed inwardly in an axial direction and adjacent to the inner second set of vanes.

* * * * *